United States Patent
Chung et al.

(10) Patent No.: US 8,211,227 B2
(45) Date of Patent: Jul. 3, 2012

(54) CEMENT-GRAPHITE COMPOSITE MATERIALS FOR VIBRATION DAMPING

(75) Inventors: Deborah Duen Ling Chung, E. Amherst, NY (US); Sivaraja Muthusamy, Buffalo, NY (US)

(73) Assignee: Deborah D. L. Chung, E. Amherst, NY (US)

( * ) Notice: Subject to any disclaimer, the term of this patent is extended or adjusted under 35 U.S.C. 154(b) by 175 days.

(21) Appl. No.: 12/624,979

(22) Filed: Nov. 24, 2009

(65) Prior Publication Data
US 2011/0120347 A1 May 26, 2011

(51) Int. Cl.
*C09C 1/44* (2006.01)
*C04B 14/00* (2006.01)
*C04B 16/00* (2006.01)
*C04B 24/00* (2006.01)
*C04B 28/00* (2006.01)
*C01B 31/04* (2006.01)

(52) U.S. Cl. ......... 106/717; 106/782; 106/472; 423/448
(58) Field of Classification Search ............... 106/600, 106/717, 782, 472; 423/448
See application file for complete search history.

(56) References Cited

U.S. PATENT DOCUMENTS

| | | | |
|---|---|---|---|
| 4,072,084 A | 2/1978 | Knight | |
| 4,623,586 A | 11/1986 | Umeya | |
| 4,774,954 A | 10/1988 | Ibrahim | |
| 4,966,636 A | 10/1990 | Wan | |
| 5,143,184 A | 9/1992 | Snyder | |
| 5,324,758 A | 6/1994 | Takahashi | |
| 5,337,288 A | 8/1994 | Sorathia | |
| 5,447,564 A * | 9/1995 | Xie et al. | 106/644 |
| 6,110,985 A | 8/2000 | Wheeler | |
| 6,503,974 B1 | 1/2003 | Ogasawara | |

(Continued)

OTHER PUBLICATIONS

Chen, Po-Hsiu; Chung D.D.L.; "Dynamic Mechanical Behavior of Flexible Graphite Made from Exfoliated Graphite". Carbon. issue 50. Sep. 6, 2011 [Retrieved Jan. 19, 2012]. Retrieved from http://pdn.sciencedirect.com/science?_ob=MiamiImageURL&_cid=271508&_user=2502287&_pii=S0008622311006956&_check=y&_origin=article&_zone=relatedPdfPopup&_coverDate=2012-01-3.*

(Continued)

*Primary Examiner* — Anthony J Green
*Assistant Examiner* — Karam Hijji

(57) ABSTRACT

This invention provides a material for vibration damping, said material comprising a composite, said composite comprising a cement matrix, and exfoliated graphite that is distributed in said composite. Said cement is preferably hydraulic cement containing calcium silicate. Said exfoliated graphite exhibits a morphology that enables the physical units of exfoliated graphite to connect mechanically. The proportion of exfoliated graphite in the composite is high enough for the exfoliated graphite to connect mechanically in the presence of cement. The proportion of cement in the composite is high enough for the cement to form a continuous matrix in the composite. This invention also provides a material for vibration damping, said material comprising a composite, said composite comprising a continuous cement matrix and a graphite network, said network being mechanically connected. In addition, this invention provides a method for making a material for vibration damping, said method comprising compressing a mixture of exfoliated graphite and cement particles at a pressure that is sufficient to cause the exfoliated graphite to bind the cement particles through mechanical connection between the physical units of exfoliated graphite, and curing the cement in the presence of water that is adequate for the cement particles to bond cementitiously to one another.

20 Claims, 4 Drawing Sheets

(a)

(b)

U.S. PATENT DOCUMENTS

| | | |
|---|---|---|
| 7,029,598 B2 | 4/2006 | Sato |
| 7,126,257 B2 | 10/2006 | Kampe |
| 7,198,858 B2 | 4/2007 | Shipton |
| 2004/0072938 A1 | 4/2004 | Simonian |
| 2005/0096412 A1 | 5/2005 | Petr |
| 2007/0062691 A1* | 3/2007 | Reddy et al. ............. 166/250.01 |
| 2007/0138917 A1 | 6/2007 | Schultz |

OTHER PUBLICATIONS

Cement and Concrete Basics. "Concrete in the Classroom". Aug. 12, 2004 [Retrieved on Jan. 19, 2012]. Retrieved from http://web.archive.org/web/20040812031010/http://www.cement.org/basics/concretebasics_lessonfive.asp.*

W. Fu and D.D.L. Chung, Vibration reduction ability of polymers, particularly polymethylmethacrylate and polytetrafluoroethylene. Polymers and Polymer Composites 9(6):423-426 (2001).

X. Fu and D.D.L. Chung, Vibration damping admixtures for cement. Cement and Concrete Research 26(1):69-75 (1996).

X. Fu, X. Li and D.D.L. Chung, Improving the vibration damping capacity of cement. Journal of Materials Science 33:3601-3605 (1998).

D.D.L. Chung, Materials for vibration damping. Journal of Materials Science 36(24):5733-5738 (2001).

J. San Juan, M.L. NO and C.A. Schuh, Nanoscale shape-memory alloys for ultrahigh mechanical damping. Nature Nanotechnology 4(7):415-419 (2009).

D.D.L. Chung, Exfoliation of graphite. Journal of Materials Science 22(12):4190-4198 (1987).

D.D.L. Chung, Flexible graphite for gasketing, adsorption, electromagnetic interference shielding, vibration damping, electrochemical applications, and stress sensing. Journal of Materials Engineering and Performance 9(2):161-163 (2000).

X. Luo and D.D.L. Chung, Vibration damping using flexible graphite. Carbon 38(10):1510-1512 (2000).

S. Wen and D.D.L. Chung, Thermoelectric behavior of carbon-cement composites. Carbon 40:2495-2505 (2002).

V.H. Guerrero, S. Wang, S. Wen and D.D.L. Chung, Thermoelectric property tailoring by composite engineering. Journal of Materials Science 37(19):4127-4136 (2002).

S. Bhattacharya, V.K. Sachdev, R. Chatterjee and R.P. Tandon, Decisive properties of graphite-filled cement composites for device application. Applied Physics A 92:417-420 (2008).

F. Peinado, A. Roig and F. Vicente, Electrochemical characterization of cement/graphite and cement/aluminium materials. Journal of Materials Science Letters 13:609-612 (1994).

N. Segre and I. Joekes, Use of tire rubber particles as addition to cement paste. Cement and Concrete Research 30:1421-1425 (2000).

D.D.L. Chung, Improving cement-based materials by using silica fume. Journal of Materials Science 37(4):673-682 (2002).

S. Wang, S. Wen and D.D.L. Chung, Resistance heating using electrically conductive cements. Advances in Cement Research 16(4):161-166 (2004).

D.D.L. Chung, Electrically conductive cement-based materials. Advances in Cement Research 16(4):167-176 (2004).

* cited by examiner (a)

CEMENT-GRAPHITE COMPOSITE MATERIALS FOR VIBRATION DAMPING

FIELD OF THE INVENTION

This invention relates to the field of materials for vibration damping. It also relates to the field of cement-based materials.

BACKGROUND OF THE INVENTION

Vibration damping refers to the reduction of mechanical vibrations, which can adversely affect a structure. Structures such as bridges, buildings, nuclear reactors, robots, rotating machinery, micromachines, optics and microelectronics benefit from vibration damping, which enhances safety, user comfort, performance, reliability, durability, seismic resistance and blast resistance.

Vibration damping is related to sound attenuation, since a sound wave is a form of vibrational wave. Therefore, materials that are effective for vibration damping tend to be effective for sound attenuation as well.

Vibration damping can be achieved passively or actively. Active damping involves the use of a coordinated set of sensor and actuator, so that the actuator suppresses the vibration through force application in real time as the vibration sensed by the sensor occurs. Due to the sensor and actuator, active damping is expensive. However, it is highly effective. A much less expensive and much more common method of damping is passive. In passive damping, materials that are inherently effective for damping are utilized for dissipating the energy associated with the vibration; sensors and actuators are not used. This invention relates to passive damping.

The damping ability of a material is described by (i) the loss tangent (also known as the loss factor, equal to two times the damping ratio), which describes the ability for oscillatory decay and (ii) the loss modulus (the storage modulus times the loss tangent), which describes the energy dissipation ability. The storage modulus is the elastic modulus during dynamic loading. Both quantities need to high for effective damping.

From the viewpoint of damping performance, damping materials of the prior art fall into three categories: (i) materials exhibiting high loss modulus but low loss tangent, such as cast iron (U.S. Pat. No. 4,966,636), Fe—Mn—Al—C based alloys (U.S. Pat. No. 4,966,636) and continuous carbon fiber reinforced epoxy (U.S. Pat. No. 4,072,084), (ii) materials exhibiting high loss tangent but low loss modulus, such as rubber, silicone, polyurethane, optionally reinforced with short fibers (U.S. Pat. No. 5,916,954; W. Fu and D. D. L. Chung, "Vibration reduction ability of polymers, particularly polymethylmethacrylate and polytetrafluoroethylene", *Polymers and Polymer Composites* 9(6):423-426 (2001)), and (iii) materials exhibiting low values of both the loss tangent and the loss modulus, such as cement-based materials containing admixtures (e.g., silica fume, latex and methylcellulose) (X. Fu and D. D. L. Chung, Vibration damping admixtures for cement. *Cement and Concrete Research* 26(1), 69-75 (1996); X. Fu, X. Li and D. D. L. Chung, Improving the vibration damping capacity of cement. *Journal of Materials Science* 33, 3601-3605 (1998)).

From the viewpoint of the material composition, damping materials of the prior art fall into five categories: (i) metals, such as metal alloys and metal-matrix composites (U.S. Pat. Nos. 4,966,636, 7,126,257, US2007/0138917), (ii) polymers (U.S. Pat. No. 6,503,974), asphalt (U.S. Pat. No. 5,324,758), their foams (U.S. Pat. No. 6,110,985) and their composites (U.S. Pat. No. 4,623,586, US 2004/0072938, U.S. Pat. Nos. 4,774,954, 5,337,288, 7,029,598), (iii) graphite and graphite-based and carbon-based materials (U.S. Pat. No. 5,143,184), (iv) ceramics (U.S. Pat. No. 7,198,858), and (v) cement-based materials (X. Fu and D. D. L. Chung, Vibration damping admixtures for cement. *Cement and Concrete Research* 26(1), 69-75 (1996); X. Fu, X. Li and D. D. L. Chung, Improving the vibration damping capacity of cement. *Journal of Materials Science* 33, 3601-3605 (1998)).

Numerous patents teach about damping materials without giving adequate damping performance data (U.S. Pat. Nos. 5,143,184, 4,966,636, 4,072,084, 5,916,954, 6,503,974, 5,324,758, 6,110,985, US 2004/0072938, U.S. Pat. Nos. 4,774,954 and 5,337,288, 7,029,598, 7,198,858, 7,126,257, US 2007/0138917). Many of these patents report the loss tangent without reporting the loss modulus or the storage modulus.

Cement is a silicate material that cures in the presence of water through a hydration reaction that forms a hydrate. During curing, the cement sets and hardens. Cement particles bond to each other in the presence of water due to this reaction. This type of bonding is known as cementitious bonding.

Cement-based materials are widely used for construction. Thus, cement-based materials with improved vibration damping ability are needed. By using silica fume as an admixture, the damping ability of cement-based materials is increased, so that both the loss modulus and the loss tangent are increased (X. Fu and D. D. L. Chung, Vibration damping admixtures for cement. *Cement and Concrete Research* 26(1), 69-75 (1996)) (Table 1).

In contrast to the low loss tangent of these cement-based materials is the high value of rubber (Table 1) (W. Fu and D. D. L. Chung, Vibration reduction ability of polymers, particularly polymethylmethacrylate and polytetrafluoroethylene. *Polymers and Polymer Composites* 9(6), 423-426 (2001)), which, however, suffers from a low loss modulus.

On the other hand, metal-matrix composites have high values of the loss modulus (D. D. L. Chung, Materials for vibration damping. *J. Mater. Sci.* 36(24), 5733-5738 (2001)) (Table 1), but they suffer from low values of the loss tangent. J. San Juan, M. L. No and C. A. Schuh (Nanoscale shape-memory alloys for ultrahigh mechanical damping. *Nature Nanotechnology* 4(7), 415-419 (2009)) compare the damping behavior of a large number of polymers, metal alloys, intermetallic compounds, shape-memory alloys, metal-matrix composites and ceramics, and report the best performance (loss tangent 0.196 and elastic modulus 22.6 GPa, i.e. loss modulus 4.43 GPa) for a nanoscale Cu—Al—Ni shape-memory alloy.

San Juan et al. (2009) use a damping figure of merit that is defined as the product of the loss tangent and the square root of the elastic modulus. The best performance material of Juan et al. (a nanoscale Cu—Al—Ni shape-memory alloy) exhibits the figure of merit 0.93 $GPa^{1/2}$.

Exfoliated graphite is an expanded form of graphite. It is obtained from graphite that has been intercalated. The graphite prior to exfoliation is commonly in the form of flakes, but it can be in other forms, such as fibers.

Graphite has a crystal structure that is layered. The carbon atoms are strongly bonded in the plane of each carbon layer, due to covalent bonding and metallic bonding. However, the carbon atoms are weakly bonded in the direction perpendicular to the carbon layers, due to the bonding being merely due to Van der Waals forces in this direction. As a result of the chemical bonding, graphite is very anisotropic in its properties.

Intercalation refers to the reaction of graphite with a reactant, which thereby enters the graphite and resides between the carbon layers in the graphite. The consequence is a compound known as a graphite intercalation compound. The reactant is known as the intercalate.

The expansion associated with the exfoliation of graphite tends to be mainly along the direction perpendicular to the carbon layers in graphite. The expansion, is commonly by hundreds of times. Due to its shape, the exfoliated graphite obtained from a graphite flake is often known as a worm, with the axis of the worm mainly along the direction perpendicular to the carbon layers. A worm commonly exhibits an accordion morphology, i.e., a morphology in which the carbon layers in the graphite are interconnected like the bellows of an accordion.

The process of exfoliation commonly involves subjecting intercalated graphite to rapid heating (D. D. L. Chung, "Exfoliation of graphite", *Journal of Materials Science* 22(12), 4190-98 (1987)). During exfoliation, shear occurs between the carbon layers, thereby enabling the formation of an accordion morphology.

Compression of exfoliated graphite without a binder results in a sheet known as flexible graphite, which is also known by its former tradename "Grafoil". "Flexible graphite" is a technical term. It does not simply mean graphite that is flexible. (D. D. L. Chung, "Flexible graphite for gasketing, adsorption, electromagnetic interference shielding, vibration damping, electrochemical applications, and stress sensing", *Journal of Materials Engineering and Performance* 9(2), 161-163 (2000); X. Luo and D. D. L. Chung, "Vibration damping using flexible graphite", *Carbon* 38(10), 1510-1512 (2000)).

TABLE 1

Damping properties of materials of the prior art

| Material | Storage modulus (GPa) | Loss tangent | Loss modulus (GPa) | Figure of merit $(GPa^{1/2})$† |
|---|---|---|---|---|
| Neoprene rubber[a]* | 0.00745 | 0.67 | 0.0067 | 0.058 |
| Polymethylmethacrylate[a]* | 3.63 | 0.093 | 0.336 | 0.18 |
| Flexible graphite[b]* | 1.0 | 0.19 | 0.21 | 0.19 |
| Cement paste (plain)[cd]* | 1.91 | 0.035 | 0.067 | 0.048 |
| Cement paste with methylcellulose (0.4%[#])[cd]* | 4.12 | 0.073 | 0.301 | 0.15 |
| Cement paste with methylcellulose (0.8%[#])[d]* | 4.53 | 0.104 | 0.471 | 0.22 |
| Cement paste with latex (20%[#])[cd]* | 2.75 | 0.122 | 0.336 | 0.20 |
| Cement paste with latex (30%[#])[d]* | 3.12 | 0.142 | 0.443 | 0.25 |
| Cement paste with silica fume (15%[#])[d]* | 5.76 | 0.107 | 0.616 | 0.26 |
| Cement paste with silica fume (15%[#]) and methylcellulose (0.4%[#])[cd]* | 6.20 | 0.105 | 0.651 | 0.26 |
| Zn—Al matrix SiC whisker composite[e]* | 99 | 0.032 | 3.0 | 0.32 |
| Flake reinforced polymer[f] | 2.5 | 0.4 | 1 | 0.63 |
| Tungsten (95%) with In—Sn[g] | 161 | 0.05 | 8.1 | 0.63 |
| Nanoscale Cu—Al—Ni shape-memory alloy[g] | 22.6 | 0.196 | 4.43 | 0.93 |

*Dynamic flexural properties obtained under three-point bending at 0.2 Hz, all obtained in the same laboratory using the same set-up as the data presented in this disclosure for the invented materials.
†Product of the loss tangent and the square root of the elastic modulus.
[#]% per mass of cement.
[a]W. Fu, and D. D. L. Chung, "Vibration reduction ability of polymers, particularly polymethylmethacrylate and polytetrafluoroethylene", Polymers and Polymer Composites 9(6), 423-426 (2001).
[b]X. Luo and D. D. L. Chung, "Vibration damping using flexible graphite", Carbon 38(10), 1510-1512 (2000).
[c]X. Fu and D. D. L. Chung, "Vibration damping admixtures for cement", Cement and Concrete Research 26(1), 69-75 (1996).
[d]X. Fu, X. Li and D. D. L. Chung, "Improving the vibration damping capacity of cement", Journal of Materials Science 33, 3601-3605 (1998).
[e]D. D. L. Chung, "Materials for vibration damping", Journal of Materials Science 36(24), 5733-5738 (2001).
[f]U.S. Pat. No. 4,623,586, with the highest values (which occur at about −20° C.) shown in Table 1 ($10^{10}$ dyne/cm² = 1 GPa).
[g]J. San Juan, M. L. No and C. A. Schuh, "Nanoscale shape-memory alloys for ultrahigh mechanical damping", Nature Nanotechnology 4(7), 415-419 (2009).

The formation of a flexible graphite sheet in the absence of a binder is due to the mechanical connection between the physical units of exfoliated graphite. A worm is an example of a physical unit of exfoliated graphite. In case of exfoliated graphite that exhibits an accordion morphology, mechanical connection between the physical units of exfoliated graphite is enabled by the accordion morphology, since the edge region of a carbon layer of one accordion (i.e., one unit) fits between the carbon layers in the edge region of the adjacent accordion (i.e., the adjacent unit). This mechanical connection is akin to fastening, but it is in a microscopic scale (a scale ranging from the nanoscale to the microscale). Upon compression, the mechanical connection becomes tight and mechanical interlocking is achieved between the physical units of exfoliated graphite.

Compared to other materials, flexible graphite is moderately attractive for damping (Luo and Chung, 2000) (Table 1). Its loss tangent is much lower than that of rubber, though its figure of merit is higher than that of rubber (Table 1). However, flexible graphite is attractive for its chemical inertness, low coefficient of thermal expansion and substantial thermal conductivity. It is used as an asbestos replacement and as a macroscopic insert in a structure for damping enhancement (U.S. Pat. No. 5,143,184).

Cement-graphite composites of the prior art involve either graphite flakes (not exfoliated) or carbon fibers (not exfoliated) used as admixtures for tailoring the thermoelectric behavior (S. Wen and D. D. L. Chung, "Thermoelectric behavior of carbon-cement composites", *Carbon* 40, 2495-2505 (2002); V. H. Guerrero, S. Wang, S. Wen and D. D. L. Chung, "Thermoelectric property tailoring by composite engineering", *Journal of Materials Science* 37(19), 4127-4136 (2002)), electromagnetic shielding behavior (S. Bhattacharya, V. K. Sachdev, R. Chatterjee, R. P. Tandon, "Decisive properties of graphite-filled cement composites for device application", *Applied Physics A* 92, 417-420 (2008) or the electrochemical behavior (F. Peinado, A. Roig and F. Vicente, "Electrochemical characterization of cement/graphite and cement/aluminium materials", *Journal of Materials Science Letters* 13, 609-612 (1994)).

In general, the loss tangent, elastic modulus and loss modulus are properties that vary with temperature for a given material. For example, for a thermoplastic polymer, softening upon heating increases the loss tangent but decreases the elastic modulus. Thus, the loss tangent is relatively high, but the elastic modulus is relatively low after softening; whereas the loss modulus is relatively high, but the loss tangent is relatively low before softening.

In terms of the figure of merit (defined as the product of the loss tangent and the square root of the elastic modulus) (Table 1), the highest performance damping material of the prior art is a nanoscale Cu—Al—Ni shape-memory alloy (J. San Juan, M. L. No and C. A. Schuh, "Nanoscale shape-memory alloys for ultrahigh mechanical damping", *Nature Nanotechnology* 4(7), 415-419 (2009)), but this material suffers from a low value of the loss tangent. In terms of the figure of merit (Table 1), the second highest performance damping materials of the prior art are tungsten with In—Sn (San Juan et al., 2009) and a flake reinforced polymer (U.S. Pat. No. 4,623,586), but the tungsten composite suffers from a low value of the loss tangent and the flake reinforced polymer suffers from a low value of the loss modulus.

Cement-based materials are commonly modified by the use of admixtures. An admixture is an additive that is introduced by mixing with the other ingredients in the cement mix. Admixture have been used in the prior art to improve the damping ability of cement-based materials.

Admixtures are commonly used at a minor proportion, so that the physical units (e.g., particles) of an admixture do not touch one another adequately to form a continuous physical network in the resulting cement-based material.

By using an admixture at a sufficiently high volume fraction in a cement-based material, the physical units (e.g., particles or short fibers) of the admixture may touch one another, thereby forming a physically continuous path. This physical continuity associated with the touching is shown by a low electrical resistivity in the resulting cement-based material in case that the admixture is electrically conductive. However, electrical connectivity is to be distinguished from mechanical connectivity. In spite of the touching, the physical units of the admixture are not mechanically connected. In other words, the physical units of the physically continuous network are not mechanically connected and mechanical connectivity is absent.

Among cement-based materials of the prior art, the material that exhibits the highest damping figure of merit (Table 1) is cement paste with admixtures in the form of silica fume and methylcellulose (X. Fu and D. D. L. Chung, "Vibration damping admixtures for cement", *Cement and Concrete Research* 26(1), 69-75 (1996)). The silica fume is in the amount of 15% by mass of cement, whereas the methylcellulose is in the amount of 0.4% by mass of cement. Silica fume is effective for improving the damping ability due to the small size of the silica fume particles and the consequent large area of the interface between silica and cement in the resulting composite. The slight slippage at the interface during vibrating provides a mechanism for damping. However, this cement-based material suffers from low values of both loss modulus and loss tangent (Table 1).

Latex particles used in the prior art as an admixture in cement-based materials for damping improvement is an elastomer (akin to rubber). Latex improves the damping ability of cement, due to the viscoelastic nature of latex. However, the improvement is by a limited degree, so that both the loss modulus and the loss tangent remain low, even when the latex is present in the large amount of 30% by mass of cement (Table 1).

The introduction of methylcellulose (a water soluble polymer) to the cement mix when the methylcellulose has been dissolved in water promotes uniform distribution of the methylcellulose in the resulting composite. Thus, methylcellulose is able to improve the damping ability of a cement-based material even when it is used at a very low proportion, such as 0.4% by mass of cement (Table 1). The mechanism of damping improvement due to methylcellulose is associated with the viscoelastic nature of methylcellulose. The damping improvement due to methylcellulose is by a degree that is comparable to or below that attained by latex (Table 1). This means that both the loss modulus and the loss tangent remain low after introduction of methylcellulose.

Rubber (as that from used tires) is used as an aggregate in concrete to improve the abilities for vibration damping, sound absorption and impact resistance (US 2005/0096412). However, the rubber aggregate suffers from its inadequate bonding with the cement matrix.

The present invention is directed to overcoming these and other deficiencies in the art.

SUMMARY OF THE INVENTION

This invention provides a material with high vibration damping ability, said material comprising a composite, said composite comprising a cement matrix, and exfoliated graphite that is distributed in said composite. Said cement is preferably a hydraulic cement containing calcium silicate. Said exfoliated graphite preferably exhibits a morphology that enables the physical units of exfoliated graphite to connect mechanically. The proportion of exfoliated graphite in the composite is preferably high enough for the physical units of exfoliated graphite to connect mechanically in the presence of cement. The proportion of cement in the composite is preferably high enough for the cement to form a continuous matrix in the composite.

This invention provides a material that exhibits exceptionally and unexpectedly high vibration damping ability, as indicated by high loss modulus (7.5 GPa), high loss tangent (0.81) and high damping figure of merit (2.47 $GPa^{1/2}$) at the same temperature. The figure of merit is defined as the product of the loss tangent and the square root of the elastic modulus (or the storage modulus).

This invention also provides a material with high vibration damping ability, said material comprising a composite, said composite comprising a continuous cement matrix and a graphite network, said network being connected mechanically. In other words, the graphite is mechanically continuous, so that the physical units of said network are mechanically connected. Said cement is preferably hydraulic cement containing calcium silicate. Said graphite is preferably exfoliated graphite. Said graphite preferably has a morphology that enables mechanical connectivity in said network. The proportion of said graphite is preferably high enough for said graphite network to form. The proportion of said cement is preferably high enough for a continuous cement matrix to form.

This invention provides a method for making a material with high vibration damping ability, said method comprising (a) compressing a mixture of exfoliated graphite and cement particles to from a compact, said compressing being conducted at a pressure that is sufficient to cause the exfoliated graphite to bind the cement particles through mechanical connection between the physical units of exfoliated graphite, and (b) curing the cement in said compact in the presence of water, said water being adequate for the cement particles to bond cementitiously to one another. Said cement is preferably hydraulic cement containing calcium silicate. Said cement particles are preferably small enough to be bound by the exfoliated graphite upon said compressing of a mixture of exfoliated graphite particles and cement particles. Said pressure is preferably low enough for the accessible porosity of the compact resulting from said compression to be sufficient for water to penetrate the compact.

DETAILED DESCRIPTION OF THE INVENTION

This invention provides a material with high vibration damping ability, said material comprising a composite, said composite comprising a cement matrix, and exfoliated graphite that is distributed in said composite. Said exfoliated graphite preferably exhibits a morphology that enables the physical units of exfoliated graphite to connect mechanically. An example of a unit of exfoliated graphite is a worm. An example of a morphology is an accordion morphology for each unit of exfoliated graphite.

The proportion of exfoliated graphite in the composite is preferably high enough for the physical units of exfoliated graphite to connect mechanically in the presence of cement. This mechanical connectivity enables the cement particles prior to curing to be held in the network formed by the exfoliated graphite. Being held in the network means that the cement particles are bound by the network, so that they do not separate from the compact obtained by compression. Moreover, the mechanical connectivity allows the graphite network as a whole to respond to vibrations. The ability of the network to respond to vibrations as a whole is in contrast to a less desirable situation in which parts of the network respond to vibrations individually. Physical connectivity (touching) without mechanical connectivity will not allow the graphite network as a whole to respond to vibrations. The ability of the network to respond to vibrations as a whole is important for achieving high damping.

The exfoliated graphite is distributed in the composite in a microscopic scale. In other words, the graphite network is microscopic in scale, with the ligaments in the network being narrow (in the micrometer scale). This fine distribution of the graphite is important for achieving high damping.

The proportion of cement in the composite is preferably high enough for the cement to form a continuous matrix in the composite. The continuity of the cement is important for attaining a high value of the elastic modulus (or the storage modulus). The exfoliated graphite is preferably in an amount ranging from 2% to 20% by volume of the composite and most preferably in an amount ranging from 5% to 10% by volume of the composite.

This invention provides a material that exhibits exceptionally and unexpectedly high vibration damping ability, as indicated by high loss modulus (7.5 GPa), high loss tangent (0.81) and high damping figure of merit (2.47 $GPa^{1/2}$) at the same temperature. This temperature is around room temperature (25° C.), which is the temperature that is most relevant to applications. The figure of merit is defined as the product of the loss tangent and the square root of the elastic modulus (or the storage modulus). The exceptional nature of the damping ability is indicated by comparison of these performance data with those of prior art materials (Table 1). The unexpected nature of the damping ability is indicated by the poor damping ability of cement and the mediocre damping ability of flexible graphite (Table 1).

This invention also provides a material with high vibration damping ability, said material comprising a composite, said composite comprising a continuous cement matrix and a graphite network. In said network, the graphite is mechanically continuous, so that the physical units of said network are mechanically connected. Said graphite is preferably exfoliated graphite. Said graphite preferably has a morphology that enables mechanical connectivity in said network. An example of said mechanical connectivity involves mechanical connection between physical units (e.g., particles) of the graphite. The proportion of said graphite is preferably high enough for said graphite network to form. The proportion of said cement is preferably high enough for a continuous cement matrix to form. Said graphite is preferably in an amount ranging from 2% to 20% by volume of the composite and most preferably in an amount ranging from 5% to 10% by volume of the composite.

This invention provides a method for making a material with high vibration damping ability, said method comprising (a) compressing a mixture of exfoliated graphite and cement particles at a pressure that is sufficient to cause the exfoliated graphite to bind the cement particles through mechanical connection between the physical units of exfoliated graphite, and (b) curing the cement in the presence of water that is adequate for the cement particles to bond cementitiously to one another. In (a), the cement particles have not been cured. In (b), cementitious bonding occurs between the cement particles, thereby resulting in a continuous cement matrix in the resulting composite material. An example of a unit of exfoliated graphite is a worm. Said cement particles are preferably small enough to be bound by the exfoliated graphite upon said compressing of a mixture of exfoliated graphite and cement particles. Said cement particles are preferably less than 100 µm in size and are most preferably less than 80 µm in size. Said pressure is preferably low enough for the accessible porosity of the compact resulting from said compression to be sufficient for water to penetrate the compact during subsequent curing. Said curing is preferably conducted by immersion in water. Said pressure preferably ranges from 1 MPa to 30 MPa and most preferably ranges from 3 MPa to 10 MPa.

The cement is preferably a hydraulic cement, i.e., cement that is capable of setting and hardening in the presence of water. It is preferably one containing calcium silicates (e.g., $3CaO.SiO_2$ and $2CaO.SiO_2$). A common type of cement containing calcium silicates is Portland cement. The cement reacts with water in a reaction known as hydration. Through this reaction, the cement hardens.

The cement-graphite composite with 8 vol. % graphite is the most attractive composite of this work. Compared to rubber and other polymers, its advantages are very high loss modulus, high loss tangent, high strength, high modulus, low electrical resistivity and superior oxidation resistance. Compared to metals, its advantages are very high loss tangent, high loss modulus, high ductility and low density.

Compared to conventional cement-based materials, the advantages of the cement-graphite composite with 8 vol. % graphite are high compressive ductility, high compressive strength, high flexural strength, high flexural toughness (area under the flexural stress-deflection curve) and low electrical resistivity, and its disadvantages are very low compressive modulus and low flexural modulus. The low resistivity is attractive for electrical grounding, lightning protection, electrostatic discharge protection, electromagnetic shielding (which is needed for the protection of electronics from radio frequency radiation) electromagnetic pulse protection and deicing (resistance heating).

The cement-graphite composite may be used for replacing polymers and metals for damping. It may also be used with conventional concrete. In one example, it is used as an aggregate in concrete for improving the damping; the composite aggregate is preferably added to the concrete mix when it is only slightly cured, so that strong cementitious bonding results between the aggregate and the cement matrix of the concrete. In another example, the cement-graphite composite is sandwiched by and cementitiously bonded to concrete for improving the damping ability of the concrete.

EXAMPLES

Example 1

Making the Materials of this Invention

This example describes the method of making the materials of this invention.

The exfoliated graphite is obtained by rapid furnace heating of intercalated graphite, which is known as expandable graphite (made from natural graphite flakes), as provided as GrafGuard (Grade 160-80N) by GrafTech International, Lakewood, Ohio. Heating of the expandable graphite above 160° C. causes gas evolution and hence exfoliation, according to the manufacturer. The flakes are of typical mean size 0.25 mm (65% on 80 mesh), with specific volume 1.25 $cm^2/g$. Exfoliation at 600° C. gives a specific volume of 200 $cm^3/g$, according to the manufacturer.

The heating is conducted in a stainless steel foil tubing of length 65 cm, with flowing nitrogen, by using a Lindberg tube furnace at 1,000° C., with the expandable graphite flakes exposed to this temperature for 2 min.

Figure 1:
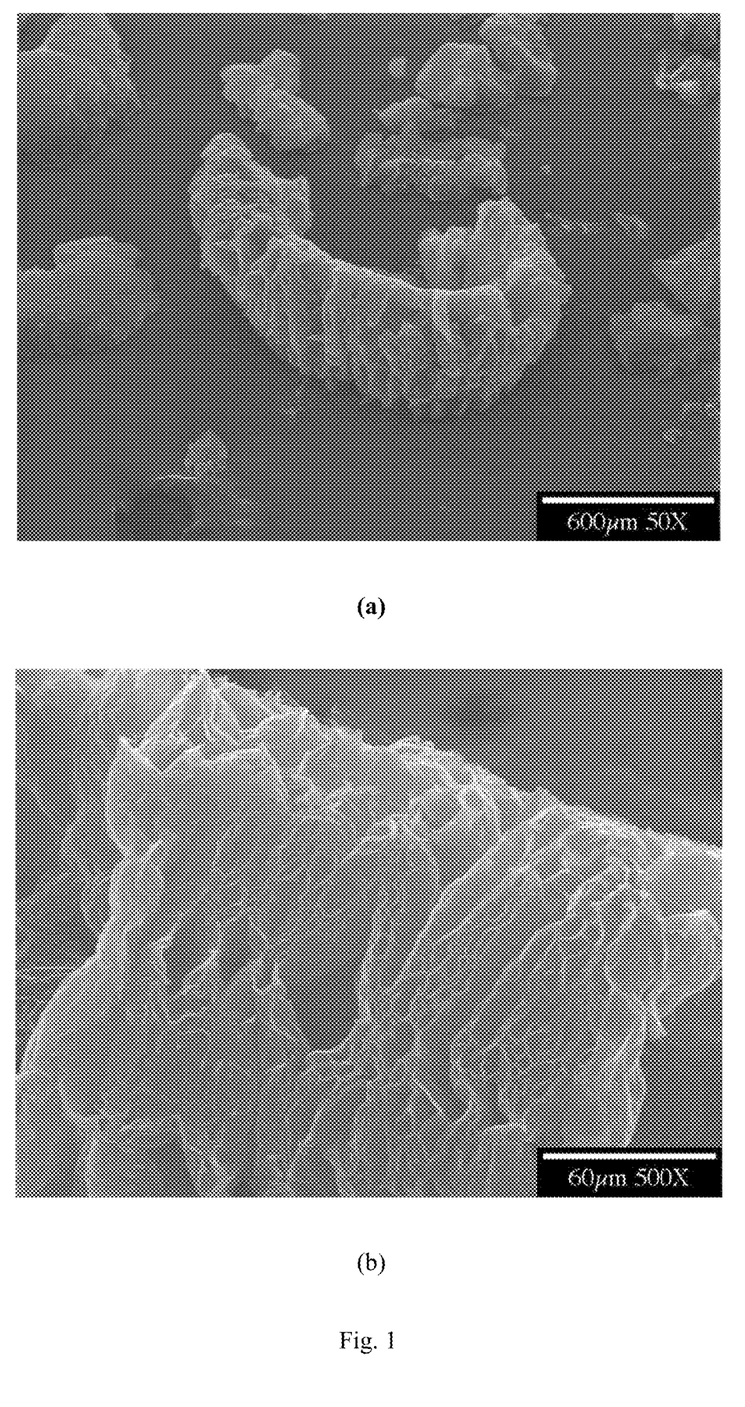
FIG. 1 shows scanning electron microscopy photographs of exfoliated graphite prior to compression.

After exfoliation, the worms (a worm referring to the exfoliated graphite obtained from a single graphite flake) are of length 2-4 mm. The exfoliated graphite exhibits an accordion morphology, as shown by the scanning electron microscope photographs in FIG. 1. FIG. 1(a) is a low magnification photograph of a few exfoliated particles. Each particle is long in the direction perpendicular to the plane of the original graphite flake from which the particle is formed, because exfoliation involves expansion in this direction. FIG. 1(b) is a high magnification photograph showing the accordion morphology within a single exfoliated graphite particle.

Cement is Type I Portland cement, as provided by Quikrete International Inc., Atlanta. The particle size of the cement is reduced by ball milling, using ceramic cylinders as the grinding medium which, along with the cement particles, is contained in a ceramic container during the milling. The ball milling time is 12 h. The milling reduces the particle size of the cement from a maximum of 90 μm to a maximum of 75 μm. Without the size reduction, the composites are much inferior. No aggregate is used.

The exfoliated graphite is mixed with cement particles prior to compression to form a sheet. After this, the sheet is exposed to water for the purpose of curing the cement in the sheet. The water exposure involves exposure to moisture for 2 days, followed by immersion in water for 26 days. After 7 days of water immersion (when the sheet is not yet very hard), the sheet is temporarily removed from the water and cut into specimens of sizes that are appropriate for various tests. After the cutting, the specimens are immediately immersed in water for further curing. Curing in moisture without water immersion gives inferior composites.

The proportion of exfoliated graphite to cement is controlled by weighing, so that the ratio of the volume of cement to the volume of graphite in the resulting composite (after compression but before curing) is 7:1, 9:1 or 12:1. With cement proportions exceeding that of 12:1, the graphite is not sufficient to bind the cement particles through mechanical interlocking of the exfoliated graphite during compression.

The volume ratio is calculated from the measured weight ratio, with the density of the flexible graphite component of the composite taken as the measured density of the unmodified flexible graphite made in this work (0.82 $g/cm^3$, which is 0.36 of the value of 2.26 $g/cm^3$ for ideal graphite, i.e., 64% porosity) and the density of cement taken as 3.15 $g/cm^3$.

The mixing is conducted in the dry state at room temperature for 24 h using a ball mill without any grinding medium.

The compression of the mixture of exfoliated graphite and cement is conducted in the dry state in a cylindrical mold of length 45 cm and inner diameter 31.75 mm by applying a uniaxial pressure of 5.6 MPa (1,000 lb) via a matching piston. The entire thickness of a composite specimen is obtained in one 5.6 MPa compression stroke. Each resulting specimen is a disc of diameter 31.75 mm and thickness ranging from 1.5 to 2.0 mm. The thickness varies among the disc and is separately measured for each disc.

Figure 2:
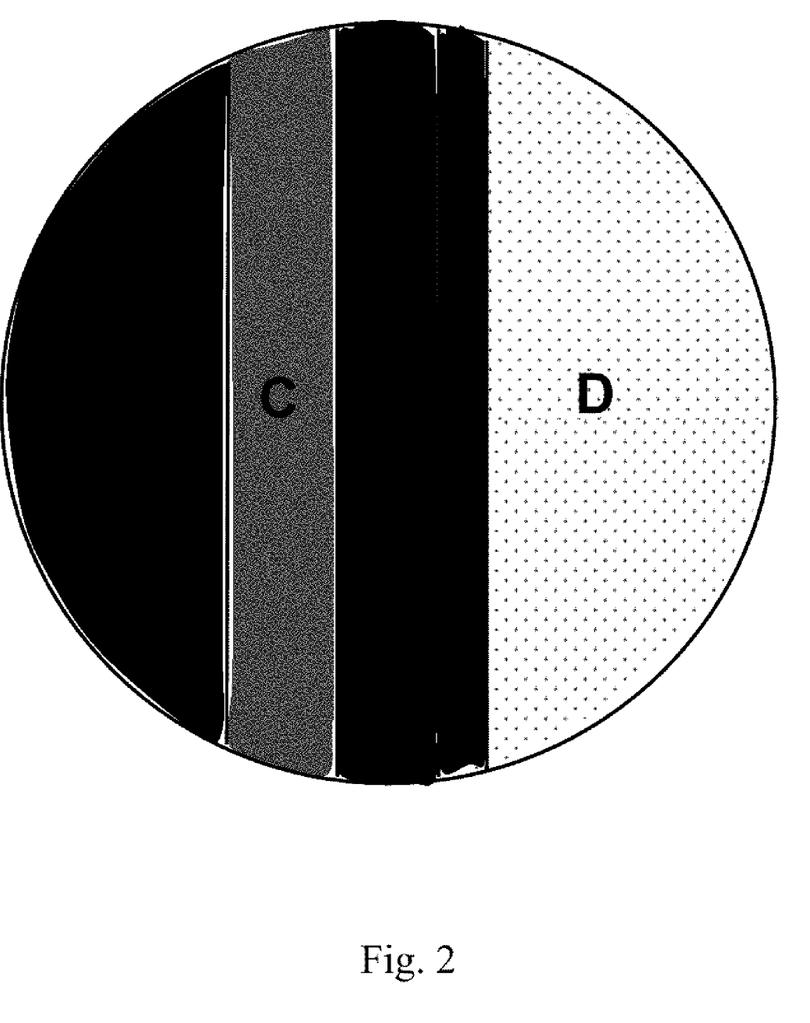
FIG. 2 shows the geometry of specimens obtained by cutting a composite sheet in the shape of a disc for use in various types of test. B: specimen for in-plane electrical resistivity measurement (length 25 mm; width 2 mm); D: specimen for through-thickness electrical resistivity measurement (length 20 mm; width 7 mm); E: specimen for compression testing (length 20 mm; width 6 mm); C: specimen for static flexural testing (length 25 mm; width 8 mm); A: specimen for dynamic flexural testing (length 30 mm; width 8 mm).
Figure 3:
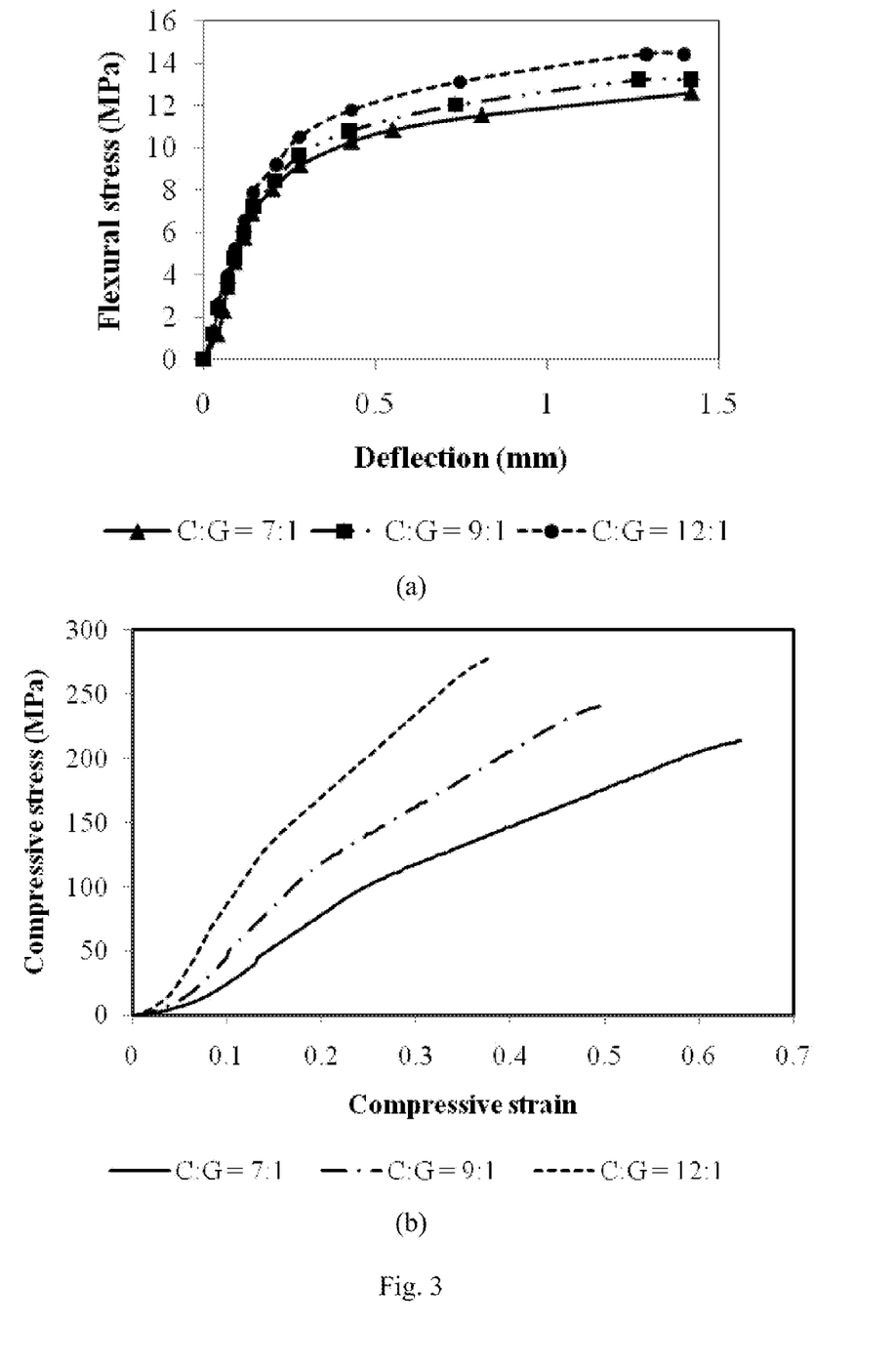
FIG. 3 shows the static mechanical behavior of cement-graphite composites with three cement-graphite (abbreviated C: G) ratios. (a) Flexural stress versus midspan deflection during static loading up to failure. (b) Compressive stress-strain curve static loading up to failure.

Each disc is cut by using a knife into a number of specimens (FIG. 2), which are used for (i) electrical resistivity measurement in the in-plane direction (specimen in the form of a beam of width about 2 mm and length about 25 mm, as measured separately for each specimen, obtained by making parallel cuts near a diameter of the disc, as indicated by B in FIG. 2), (ii) electrical resistivity measurement in the through-thickness direction (moon-shaped specimen, with largest width about 7 mm and largest length about 20 mm, as shown by D in FIG. 2), (iii) compressive testing (moon-shaped specimen, with largest width about 6 mm and largest length about 20 mm, as shown by E in FIG. 2), (iv) static flexural testing (specimen in the shape of a beam of width about 8 mm and length about 25 mm, as shown by C in FIG. 3) and (v) dynamic flexural testing (specimen in the shape of a beam of width about 8 mm and length about 30 mm, as shown by A in FIG. 2).

Example 2

Method of Vibration Damping Evaluation

This example describes the method of vibration damping evaluation used in this work.

Dynamic flexural testing (ASTM D 4065-94) at a controlled frequency of 0.2 Hz is conducted at room temperature under three-point bending using a dynamic mechanical analyzer (DMA7, Perkin Elmer Corp., Norwalk, Conn.). The span is 20 mm. The loads used are large enough that the amplitude of the specimen deflection ranges from 5 to 10 μm (which is over the minimum value of 5 μm required by the equipment for accurate results). The storage modulus (elastic modulus under dynamic loading, i.e., the real part of the complex modulus) is measured at a static load range of 40 to 70 mN (static flexural stress of 0.25 MPa) and a dynamic load range of 30 to 60 (dynamic flexural stress of 0.2 MPa). Measurements of the loss tangent (tan δ) and storage modulus are made simultaneously. The damping ratio is half of the loss tangent (also called the loss factor). The loss modulus is the product of the loss tangent and the storage modulus.

Example 3

Methods of Evaluating the Static Mechanical Properties

This example describes the methods, as used in this work, for evaluating the static mechanical properties. One method pertains to the flexural properties, i.e., testing during bending of the specimen in the plane of the composite sheet. The other method pertains to the compressive properties, i.e., testing during compression of the specimen in the direction perpendicular to the plane of the composite sheet.

The static flexural properties are measured under three-point bending (span=20 mm) up to failure. A Sintech 2/D (MTS Systems Corp., Marblehead, Mass.) screw-action mechanical testing system is used. The flexural modulus is obtained from the slope of the resulting curve of flexural stress versus midspan deflection.

Compressive testing is conducted using a hydraulic mechanical testing system (MTS Model 810). The controlled displacement rate is 0.5 mm/min. For each specimen, testing is conducted up to failure. From the slope of the stress-strain curve near the origin, the compressive modulus is determined.

Example 4

Methods of Evaluating the Electrical Resistivity

This example describes the methods, as used in this work, for evaluating the electrical resistivity. The resistivity is measured in the plane of the composite sheet and in the direction perpendicular to this plane. The DC resistivity is measured.

The electrical resistivity is not directly related to the damping properties. However, it reveals the extent of electrical connectivity of the graphite component of the composite, since the graphite component is much more conductive (by orders of magnitude) than the cement component.

The electrical resistivity is measured by using the four-probe method, with silver paint in conjunction with copper wire or foil serving as electrical contacts.

For measuring the in-plane resistivity, the electrical contacts are in the form of lines (of width about 1 mm) applied perimetrically around the specimen strip, such that the outer contacts (for passing current) are about 23 mm apart and the inner contacts (for voltage measurement) are about 15 mm apart.

For measuring the through-thickness resistivity, (i) each of the two current contacts on the two opposite in-plane surfaces of a specimen is in the form of a copper foil with silver paint between the foil and the specimen, such that the foil covers the entire in-plane surface of the specimen, except for a centered rectangular opening of edge length about 4 mm along the length of the moon shape and about 2 mm along the width of the moon shape, and (ii) each of the two voltage contacts is in the form of silver paint in conjunction with copper wire applied as a dot (diameter about 2 mm) within the rectangular opening mentioned above.

A Keithley Model 224 programmable DC current source is used to provide a current, which is around 0.1 A, and is exactly measured by using a standard resistor (of resistance similar to that of the specimen, i.e., 0.1Ω for in-plane resistance measurement and 0.001Ω for through-thickness measurement) that is electrically in series with the specimen. A Keithley Model 2001 DC digital multimeter is used for measuring the voltage between the two voltage contacts of the specimen.

Example 5

Vibration damping performance

This example describes the results of the vibration damping evaluation using the method described in Example 2.

Table 2 shows that the storage modulus, loss modulus and loss tangent all increase with increasing cement content in the graphite-cement composite. The increase in storage modulus is due to the high stiffness of cement compared to graphite. The increase in loss tangent is due to the increased degree of two-dimensionality and the consequent increase in the ease of shear of the graphite.

TABLE 2

Vibration damping performance of the materials of this invention. The data were obtained under dynamic flexure (three-point bending) at 0.2 Hz, all obtained in the same laboratory using the same set-up.

| Cement/graphite volume ratio | Graphite volume fraction* | Storage modulus (GPa) | Loss tangent | Loss modulus (GPa) | Figure of merit $(GPa^{1/2})$† |
|---|---|---|---|---|---|
| 7:1 | 0.13 | 2.70 ± 0.12 | 0.425 ± 0.034 | 1.148 ± 0.056 | 0.70 |
| 9:1 | 0.10 | 6.84 ± 0.20 | 0.634 ± 0.022 | 4.337 ± 0.110 | 1.66 |
| 12:1 | 0.077 | 9.26 ± 0.16 | 0.811 ± 0.045 | 7.502 ± 0.224 | 2.47 |

*Before curing. The value is slightly lower after curing.

†Defined as the product of the loss tangent and the square root of the elastic modulus.

The best performance composite of this work is the one with 7.7 vol. % graphite. Its figure of merit is 2.47 GPa$^{1/2}$, which is higher than the highest value of 0.93 GPa$^{1/2}$ in the prior art (Table 1). Its loss modulus is 7.5 GPa, which is higher than the highest value of 4.43 GPa in the prior art (Table 1). Its loss tangent is 0.81, which is higher than the value of 0.67 for rubber, which is among the materials with the highest values of the loss tangent in the prior art (Table 1).

Example 6

Static Flexural Properties

This example describes the results of static flexural testing using the method described in Example 3. Flexure is a common mode of loading encountered by structures.

Table 3 and FIG. 3(a) show that the flexural strength and modulus increase with increasing cement content. The flexural strength is higher than the value of 5.6 MPa for unmodified cement paste (N. Segre and I. Joekes, "Use of tire rubber particles as addition to cement paste", *Cement and Concrete Research* 30, 1421-1425 (2000)), whereas the flexural modulus is lower than the value of 5.9 GPa for unmodified cement paste (N. Segre and I. Joekes, "Use of tire rubber particles as addition to cement paste", *Cement and Concrete Research* 30, 1421-1425 (2000)).

TABLE 3

Static mechanical properties, electrical resistivity and density of the materials of this invention.

| | Cement/graphite ratio in mix | | |
|---|---|---|---|
| | 7:1 | 9:1 | 12:1 |
| Graphite volume fraction* | 0.13 | 0.10 | 0.077 |
| Compressive strength (MPa) | 213 ± 10 | 241 ± 8 | 278 ± 12 |
| Compressive modulus (GPa) | 0.332 ± 0.043 | 0.488 ± 0.045 | 0.729 ± 0.052 |
| Flexural strength (MPa) | 12.68 ± 0.84 | 13.24 ± 0.66 | 14.50 ± 1.10 |
| Flexural modulus (GPa) | 2.45 ± 0.25 | 2.82 ± 0.34 | 3.35 ± 0.35 |
| Density (g/cm$^3$) | 1.95 | 2.05 | 2.16 |
| In-plane resistivity ($10^{-3}$ Ω · cm) | 13 ± 7 | 20 ± 5 | 36 ± 9 |
| Through-thickness resistivity ($10^{-3}$ Ω · cm) | 100 ± 10 | 240 ± 10 | 480 ± 10 |
| Through-thickness/in-plane resistivity ratio | 8.3 | 12 | 13 |

*Before curing. The value is slightly lower after curing.

Example 7

Static Compressive Properties

This example describes the results of static compressive testing using the method described in Example 3.

Table 3 and FIG. 3(b) show that the compressive strength and modulus increase with increasing cement content. The compressive strength is much higher than the value of 58 MPa for unmodified cement paste (D. D. L. Chung, Improving cement-based materials by using silica fume. *J. Mater. Sci.* 37(4) 673-682 (2002)), whereas the compressive modulus is much lower than the value of 2.9 GPa for unmodified cement paste (D. D. L. Chung, Improving cement-based materials by using silica fume. *Journal of Materials Science* 37(4) 673-682 (2002)). The strain at failure (ductility) decreases with increasing cement proportion. However, the strain is very high (0.38 or 38%, FIG. 3(b)) even for the highest cement proportion, compared to the value of 1.7% for unmodified cement paste (D. D. L. Chung, "Improving cement-based materials by using silica fume", *Journal of Materials Science* 37(4) 673-682 (2002)). The low values of the compressive and flexural moduli (Table 3) relate to the high ductility.

Example 8

Electrical Resistivity

This example describes the results of electrical resistivity measurement made using the method described in Example 4.

Table 3 shows that the in-plane and through-thickness resistivities and the through-thickness/in-plane resistivity ratio all increase with increasing cement content. For the same cement content, the through-thickness resistivity is much higher than the in-plane resistivity, indicating preferred in-plane orientation of the graphite basal plane. A higher value of the resistivity ratio means more two-dimensionality. Hence, the higher the cement proportion, the more is the two-dimensionality.

The highest in-plane resistivity of 0.036 Ω·cm and the highest through-thickness resistivity of 0.48 Ω·cm, both obtained at the highest cement proportion, are considerably lower than the lowest value of 1 Ω·cm previously reported for cement-matrix composites containing conductive admixtures, such as steel and carbon microfibers at volume fractions above the percolation threshold (S. Wang, S. Wen and D. D. L. Chung, "Resistance heating using electrically conductive cements", *Advances in Cement Research* 16(4), 161-166 (2004)). The percolation threshold refers to the volume fraction of a conductive discontinuous filler (such as particles or short fibers) above which the physical units (each unit being, for example, a filler particle) of the filler touch one another to form a continuous conductive path. This means that the electrical connectivity of the graphite in the cement-graphite composites is superior to that of cement containing a conductive microfiber beyond the percolation threshold. This superiority is attributed to the mechanical interlocking of the exfoliated graphite.

The interlocking makes the graphite a network, which is believed to help the damping ability of the composite. The network can undergo shear deformation, in contrast to the limited extent of shear deformation for a composite with a high-shear filler (such as rubber) that is discontinuous. For the unmodified cement paste, the resistivity is high—$10^5$ Ω·cm (D. D. L. Chung, "Electrically conductive cement-based materials", *Advances in Cement Research* 16(4), 167-176 (2004)).

For flexible graphite without cement and prepared by similar compression of the same exfoliated graphite, the in-plane resistivity is 0.002 Ω·cm, the through-thickness resistivity is 0.04 Ω·cm and the through-thickness/in-plane resistivity ratio is 20. Hence, the resistivities and resistivity ratio of the cement-graphite composites are higher than those of flexible graphite. The higher resistivity ratio of flexible graphite means that flexible graphite is more two-dimensional than the cement-graphite composites.

Example 9

Density

This example describes the density of the composites of this invention, as obtained by measuring the mass and volume of each specimen.

Table 3 shows the density of the composites. The density increases with decreasing graphite proportion. The values are comparable to that of 2.01 g/cm$^3$ for unmodified cement paste (D. D. L. Chung, "Improving cement-based materials by using silica fume", *Journal of Materials Science* 37(4) 673-682 (2002)).

The rather high value of the density of the composite with the highest cement proportion suggests that the porosity is low, as expected from the conformability (squishability) of the exfoliated graphite. The low porosity contributes to the high compressive strength and high flexural strength. Due to the low porosity, this composite is expected to be low in water permeability (not measured). A low permeability is valuable for the corrosion resistance of steel reinforced cement-based materials.

Example 10

Microscopy

This example describes scanning electron microscopy (SEM) photographs of the fracture surface obtained after static flexural testing up to failure according to the method of Example 3.

Figure 4:
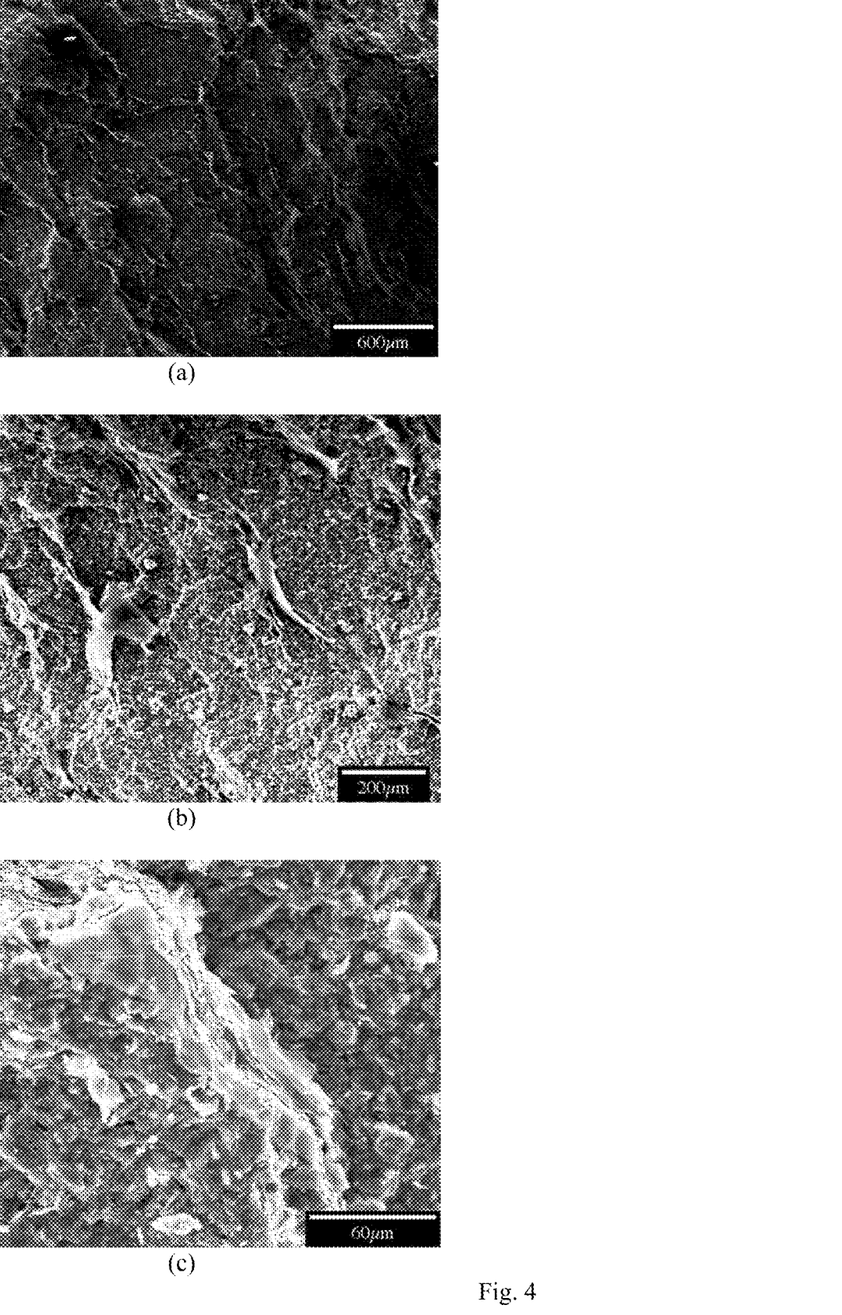
FIG. 4 shows scanning electron microscope photographs of the fracture surface of the composite with 8 vol. % graphite, as obtained after static flexural testing up to failure.

FIG. 4 shows the SEM photographs of the composite with 8 vol. % graphite. The lowest magnification photograph (FIG. 4(a)) shows graphite as ridges that are preferentially in the plane of the specimen. This preferred orientation is consistent with the electrical anisotropy. The ridges suggest the occurrence of shear in the graphite. In addition, FIG. 4(a) shows indications of a graphite network. The ridges are shown more clearly as bright regions in the intermediate magnification photograph (FIG. 4(b)). The highest magnification photograph (FIG. 4(c)) shows an intimate interface between graphite (bright region) and the cement matrix. This is consistent with the rather high density (Table 3). In addition, FIG. 4(c) shows the accordion morphology within the graphite region.

As shown in FIG. 4, the exfoliated graphite is distributed in the composite in a microscopic scale. In other words, the graphite network is microscopic in scale, with the ligaments in the network being narrow (in the micrometer scale).

For the composites with lower cement proportions, SEM photographs show greater proportions of graphite.

Although preferred embodiments have been depicted and described in detail herein, it will be apparent to those skilled in the relevant art that various additions, substitutions, modifications and the like can be made without departing from the spirit of the invention and these are therefore considered to be within the scope of the invention as defined in the claims which follow.

What is claimed:

1. A material for vibration damping, said material comprising a composite,
said composite comprising
(a) a cement matrix, and
(b) exfoliated graphite,
said graphite being in contact with said matrix,
said graphite substantially exhibiting a structure,
said structure consisting essentially of a network,
said network substantially exhibiting mechanical continuity,
said network consisting essentially of a plurality of units of exfoliated graphite,
each of said units substantially exhibiting a microstructure,
said microstructure consisting essentially of a plurality of carbon layers,
said layers being substantially interconnected,
said units being connected mechanically,
said connecting of said units being enabled by said microstructure.

2. The material of claim 1, wherein each of said units is substantially derived from a worm.

3. The material of claim 1, wherein said graphite in said network substantially exhibits mechanical continuity.

4. The material of claim 1, wherein said cement consists essentially of hydraulic cement.

5. The material of claim 1, wherein said continuity is substantially enabled by a mechanism, said mechanism consisting essentially of mechanical interlocking between said units, said interlocking being enabled by said microstructure.

6. The material of claim 1, wherein said graphite is in an amount ranging from 2% to 20% by volume of the composite.

7. A method for making a material for vibration damping,
said material comprising a composite, said composite comprising
(i) a continuous cement matrix, and
(ii) a graphite network,
said method comprising
(a) forming a mixture consisting essentially of graphite and cement particles,
said graphite consisting essentially of plurality of pieces,
each of said pieces consisting essentially of exfoliated graphite,
said exfoliated graphite substantially exhibiting a microstructure,
said microstructure consisting essentially of a plurality of carbon layers,
said layers being substantially interconnected, and
said cement particles not having undergone substantial hydration,
(b) compressing said mixture to substantially form a compact,
said cement articles not having uncle one substantial hydration during said compression,
said pieces being mechanically connected in said compact,
said connection substantially resulting in a network,
said network substantially exhibiting mechanical continuity,
said connection being enabled by said microstructure, and
(c) subjecting said cement in said compact to substantial hydration.

8. The method of claim 7, wherein said cement consists essentially of hydraulic cement, said cement particles exhibiting particle size less than 100 μm.

9. The method of claim 7, wherein each of said pieces consists essentially of a worm.

10. The method of claim 7, wherein said exfoliated graphite is substantially derived from graphite in flake form.

11. The method of claim 7, wherein said forming of said mixture is conducted using a method consisting essentially of dry mixing.

12. The method of claim 7, wherein said subjecting of said cement in said compact to substantial hydration is conducted using a method consisting essentially of
(a) exposure to moisture, and
(b) immersion in water.

13. The method of claim 7, wherein said compressing is conducted at a pressure ranging from 1 MPa to 30 Mpa.

14. A material for vibration damping, said material comprising a composite,
   said composite comprising
   (a) a continuous cement matrix, and
   (b) network,
   said network consisting essentially of graphite,
   said graphite in said network substantially exhibiting mechanical continuity,
   said network comprising units,
   each of said units consisting essential of graphite,
   each of said units being in contact with said matrix,
   said units being mechanically connected,
   each of said units substantially exhibiting a microstructure,
   said microstructure consisting essentially of a plurality of carbon layers,
   said layers being substantially interconnected,
   said microstructure enabling said units to connect mechanically.

15. The material of claim 14, wherein said cement consists essentially of hydraulic cement.

16. The material of claim 14, wherein said graphite is substantially derived from exfoliated graphite.

17. The material of claim 14, wherein each of said units is substantially derived from a worm.

18. The material of claim 14, wherein said graphite is substantially derived from exfoliated graphite,
   said exfoliated graphite being substantially derived from graphite flakes.

19. The material of claim 14, wherein said graphite is in an amount ranging from 2% to 20% by volume of the composite.

20. The material of claim 14, wherein said continuity is substantially enabled by a mechanism, said mechanism consisting essentially of mechanical interlocking between said units, said interlocking being enabled by said microstructure.

* * * * *